July 20, 1948.  H. H. COOKE ET AL  2,445,311
INCENDIARY BOMB MIXTURE
Filed March 28, 1942
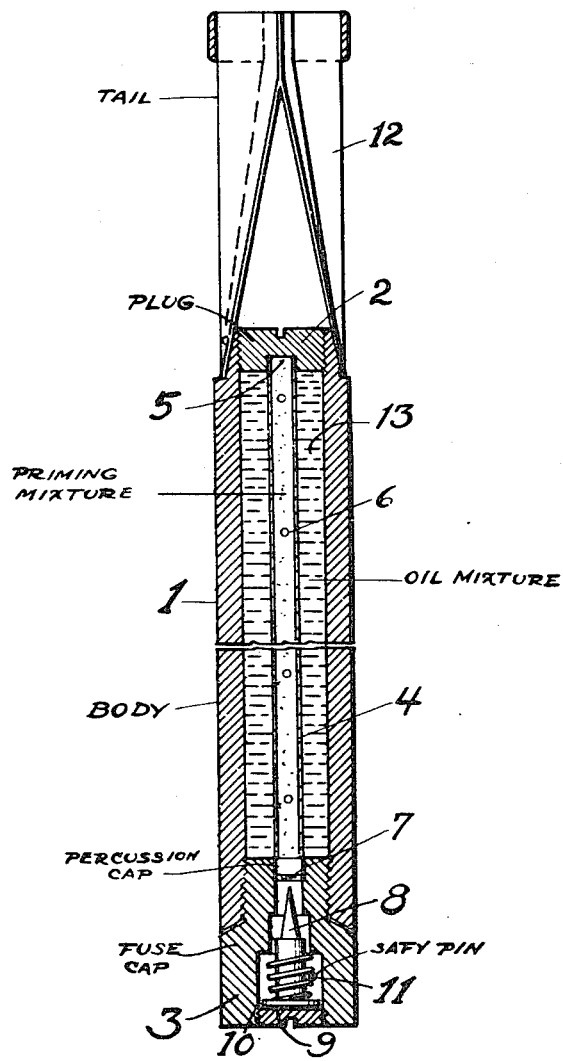

Patented July 20, 1948

2,445,311

UNITED STATES PATENT OFFICE 2,445,311

INCENDIARY BOMB MIXTURE

Henry H. Cooke, Elizabeth, and John B. Holtzclaw, Roselle, N. J., assignors to Stanco Incorporated, a corporation of Delaware Application March 28, 1942, Serial No. 436,594

6 Claims. (Cl. 44—7)

This invention relates to incendiary oil bombs containing an inflammable volatile liquid hydrocarbon that is given a suitable consistency by high molecular weight polymers of isobutylene in the incendiary mixture. It has the object of making an incendiary oil mixture more effective in its function and particularly better adapted for use in airplane bombs.

Despite the intensive studies and work carried out to provide suitable incendiary agents, very few have survived tests of modern warfare and only the magnesium thermite type of bomb has become recognized as suitably efficient, though oil bombs have received most attention. Several factors have been inimical to the oil type bombs even though they would be relatively less expensive, could be used to relieve shortages of magnesium and aluminum, and could be used more advantageously than the thermite type bomb under certain circumstances.

It has been found important that the oil incendiary contain an inflammable liquid, such as a volatile hydrocarbon oil, which can ignite readily. On the other hand, a volatile oil alone burns too rapidly, or simply explodes without starting conflagration. In burning too rapidly, the oil consumes oxygen and thus tends to extinguish itself. Under some conditions, the volatile oil becomes too readily dispersed, out of contact with material intended to be ignited, and does not give the intensity of heat necessary to start destructive fires.

To prevent an incendiary oil mixture from being rendered ineffective through scattering, soaps have been admixed with the oil to form wax-like solid or solidified oil compositions, but these were not satisfactory because the solidified material made with the soaps are granular and crumbly after being exposed to low temperatures. These materials have to be used in heavy bomb casings to avoid dissipation of heat and flame from wide scattering which attends shattering of the bomb.

Another attempt to improve on the oil incendiary mixtures involved the use of raw rubber without much greater success, for in the ordinary use of the bombs from airplanes, the attacking plane is often forced to fly at high altitudes, and accordingly, the incendiary mixture in the bomb is cooled to very low temperatures even in warm seasons, thus causing the rubber to become frozen so that the oil mixture is solidified much the same as in the use of the soaps. In such a solidified form, the incendiary mixture is not readily ignited, and if scattered, becomes ineffectual.

In accordance with the present invention, the defects of oil incendiary mixtures have been overcome by incorporating iso-olefin polymers of high molecular weight with inflammable naphtha to form a highly viscous mass which is almost semi-solid in consistency but which does not harden at extremely low temperatures comparable to stratosphere temperatures. This material ignites easily and burns freely even when exposed to extremely low temperatures, it remains very sticky under all conditions, i. e., when burning or cold, and upon being scattered in explosion or shattering of the bomb, is capable of carrying flame persistently in the portions thrown out to start numerous small fires which are capable of causing great destruction.

The isobutylene polymers found most satisfactory for the present purposes are those having molecular weights above 30,000 more preferably between about 50,000 and 100,000. These polymers are commercially available products that are produced by polymerization of isobutylene at low temperatures ranging from about $-40°$ C. to about $-100°$ C. with the aid of an active halide catalyst, such as boron fluoride. The molecular weight of these polymers or the extent of the polymerization is increased in proportion to the lowering of the reaction temperature. The crude or raw polymer product is satisfactory for the present purposes.

The major ingredient of the incendiary oil agent is preferably available low boiling mixtures of hydrocarbons having the characteristics of petroleum gasoline, solvent naphtha, or kerosene. The volatile oil need not be refined to any particular degree. Other combustible substances, such as powdered coal, tars, turpentine, and the like may be admixed.

To obtain a suitable consistency in making up the incendiary oil mixture with the isobutylene polymers, good results are obtained in using about 10% to 25% by weight of the polymer based on the weight of naphtha hydrocarbons. The proportion of the polymer required is greater as the molecular weight of the polymer is lowered. The mixture obtained is a sticky viscid or gummy mass. The consistency is suitable also when the mass has fluidity and can be poured.

In the event it is desirable to make a conservation in the amount of polymer used in the mixture, small amounts of compatible soaps have been found useful for obtaining the proper consistency in substitution for a portion of the polymer. Suitable soaps for this purpose are base metal soaps of organic acids which are normally solid. For example, sodium soaps of hydrogenated fish oil acids, sodium salts of resins, rosins, or high molecular weight napthenic acids. In these soaps the organic acid radical contains on the average of more than 18 carbon atoms per molecule. From about 1% to about 3% of such soaps may be employed to replace about 5% of the isobutylene polymer without detracting from the desired effects.

The thick oil incendiary mixture may be modified by the addition of other agents for various needs. For example, metallic sodium or metallic potassium may be added to promote ignition in the presence of water. Phosphorus of yellow or red varieties may be added to promote ignition by spontaneous ignition on exposure to air. Carbon bisulfide or alkyl halides may be added to modify the flash point of the naphtha. Also, the oil incendiary agent may be used in conjunction with other priming compositions, such as mixtures of iron oxide with powdered aluminum, and magnesium.

The construction of airplane incendiary bombs in which the improved incendiary mixtures are placed may be any of the well known types. These consist of three main parts: the bomb body, stabilizing tail fins to maintain the bomb in vertical position when dropping; and a fuse mechanism for starting ignition on impact of the bomb. The fuse may be made to ignite a priming mixture or powder train, or to detonate a charge of high explosive carried in a tube or booster in the center of the bomb. Black powder may be used to form the powder train.

The fuse mechanisms in the bombs follow well established principles. In one common form of fuse, a spring coil holds back a striking pin from a detonating cap until inertia of a movable part on impact closes the spring and drives the striking pin into contact with the cap. In a simpler mechanism, the cap containing a fulminate detonator, is protected from contact with the striking pin by an intervening piece of metal until impact breaks the metal.

The following example is given with reference to the accompanying drawing which illustrates a form of bomb in which the incendiary agent formulated in accordance with the present invention may be used but the invention is not restricted to this example or the particular arrangement shown. A cross-sectional elevation view of the bomb structure is shown in the drawing.

The body of the bomb is enclosed within casing 1 which may be constructed of a magnesium or aluminum alloy, or thin sheet steel. At the upper end of the tubular casing is fitted a metal plug 2 having a threaded engagement with the casing. At the lower end of the casing is fitted a fuse cap 3. A central cylindrical tube 4 extends through the center of the body concentric with the casing. The upper end of this tube is held in a recess 5 within the plug 2 and the lower end of tube 4 is in alignment and contact with the upper part of the fuse mechanism. Tube 4 is filled with a priming composition or blasting powder. A number of small perforations or indentations 6 may be provided in tube 4 to ensure ignition when the bomb is shattered.

A fulminate percussion cap 7 is made to rest in a slot at the upper part of the fuse cap 3, contiguous to the priming mixture contained in the central tube 4. The striker pin 8 in the fuse mechanism is a pointed projection on the block 9 which is held apart from the percussion cap by coil spring 10 until on impact, block 9 is driven up against the spring by inertia, thus causing contact of the striking pin with the percussion cap.

To prevent untimely detonation, a small wire 11 acting as a safety pin is inserted through the fuse cap to ensure that the block attached to the firing pin does not move. This safety pin is removed as the bombs are about to be dropped.

To the upper part of the casing 1 is attached a tail fin 12. The incendiary oil agent is placed in the annular space 13 surrounding the inner priming tube 4.

The foregoing description is merely illustrative, and alternative arrangements may be made. Although specific examples have been given of the composition of the oil incendiary agent, other modifications may be made which come within the scope of the invention as set forth in the appended claims.

We claim:

1. An incendiary liquid for an incendiary oil bomb which comprises a thick semi-liquid, readily ignitable material compounded of naphtha with from about 10% to 25% by weight of iso-olefin polymers having molecular weights above 30,000.

2. An incendiary oil bomb containing readily ignitable naphtha hydrocarbons thickened to a viscid mass by isobutylene polymers and containing an incendiary mixture of metallic aluminum and oxide of iron.

3. An oil incendiary mixture adapted for use in airplane incendiary bombs, which comprises a volatile inflammable liquid thickened to a gummy mass of highly viscous consistency by high molecular weight isobutylene polymers.

4. An incendiary constituent for an incendiary oil bomb mixture which avoids hardening at extremely low temperatures comprising inflammable naphtha hydrocarbons thickened to a viscid gummy mass by isobutylene polymers having molecular weights between about 50,000 and 100,000.

5. An incendiary constituent for an incendiary oil bomb mixture which avoids hardening at extremely low temperatures comprising inflammable naphtha hydrocarbons thickened to a viscid gummy mass by high molecular weight iso-olefin polymers and containing a highly combustible solid metallic material.

6. An incendiary constituent for an incendiary oil bomb according to claim 1 in which the thick semi-liquid, readily ignitable material is naphtha compounded with from about 10% to 25% of isobutylene polymers of molecular weight between about 50,000 and 100,000.

HENRY H. COOKE.
JOHN B. HOLTZCLAW.

REFERENCES CITED

The following references are of record in the file of this patent:

UNITED STATES PATENTS

| Number | Name | Date |
|---|---|---|
| 36,934 | Berney | Nov. 11, 1862 |
| 650,210 | Wilson | May 22, 1900 |
| 1,294,150 | Ortiz | Feb. 11, 1919 |
| 1,484,190 | Ray | Feb. 19, 1924 |
| 2,049,062 | Howard | July 28, 1936 |

FOREIGN PATENTS

| Number | Country | Date |
|---|---|---|
| 399,527 | Great Britain | Aug. 1933 |